United States Patent
Zhong et al.

(10) Patent No.: US 11,575,873 B2
(45) Date of Patent: Feb. 7, 2023

(54) MULTISPECTRAL STEREO CAMERA SELF-CALIBRATION ALGORITHM BASED ON TRACK FEATURE REGISTRATION

(71) Applicant: DALIAN UNIVERSITY OF TECHNOLOGY, Liaoning (CN)

(72) Inventors: Wei Zhong, Liaoning (CN); Haojie Li, Liaoning (CN); Boqian Liu, Liaoning (CN); Zhihui Wang, Liaoning (CN); Risheng Liu, Liaoning (CN); Zhongxuan Luo, Liaoning (CN); Xin Fan, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 0 days.

(21) Appl. No.: 17/283,772

(22) PCT Filed: Mar. 5, 2020

(86) PCT No.: PCT/CN2020/077952
§ 371 (c)(1),
(2) Date: Apr. 8, 2021

(87) PCT Pub. No.: WO2021/098081
PCT Pub. Date: May 27, 2021

(65) Prior Publication Data
US 2022/0046220 A1 Feb. 10, 2022

(30) Foreign Application Priority Data
Nov. 22, 2019 (CN) .......................... 201911153778.5

(51) Int. Cl.
*H04N 13/246* (2018.01)
*G06T 7/80* (2017.01)
(Continued)

(52) U.S. Cl.
CPC ......... *H04N 13/246* (2018.05); *G06K 9/6201* (2013.01); *G06T 5/006* (2013.01);
(Continued)

(58) Field of Classification Search
None
See application file for complete search history.

(56) References Cited

U.S. PATENT DOCUMENTS 5,794,173 A * 8/1998 Schutte ...................... G06T 7/20
701/466
7,317,812 B1 * 1/2008 Krahnstoever ......... G06F 3/011
382/103

(Continued)

FOREIGN PATENT DOCUMENTS

CN 104359464 A 2/2015
CN 105701827 A 6/2016
(Continued)

OTHER PUBLICATIONS

Lin, Kuen-Han, and Chieh-Chih Wang. "Stereo-based simultaneous localization, mapping and moving object tracking." 2010 IEEE/RSJ International Conference on Intelligent Robots and Systems. IEEE, 2010 (Year: 2010).*

(Continued)

*Primary Examiner* — Stefan Gadomski
(74) *Attorney, Agent, or Firm* — Muncy, Geissler, Olds & Lowe, P.C.

(57) ABSTRACT

The present invention discloses a multispectral stereo camera self-calibration algorithm based on track feature registration, and belongs to the field of image processing and computer vision. Optimal matching points are obtained by extracting and matching motion tracks of objects, and external parameters are corrected accordingly. Compared with an ordinary method, the present invention uses the tracks of (Continued)

moving objects as the features required for self-calibration. The advantage of using the tracks is good cross-modal robustness. In addition, direct matching of the tracks also saves the steps of extraction and matching the feature points, thereby achieving the advantages of simple operation and accurate results.

4 Claims, 2 Drawing Sheets

(51) Int. Cl.
    *G06T 7/33*     (2017.01)
    *H04N 13/254*     (2018.01)
    *G06K 9/62*     (2022.01)
    *G06T 5/00*     (2006.01)
    *G06T 7/20*     (2017.01)

(52) U.S. Cl.
    CPC ............ *G06T 7/20* (2013.01); *G06T 7/33* (2017.01); *G06T 7/85* (2017.01); *H04N 13/254* (2018.05); *G06T 2207/10048* (2013.01)

(56) References Cited

U.S. PATENT DOCUMENTS

| | | | |
|---|---|---|---|
| 9,898,677 B1* | 2/2018 | Andjelković | G06T 7/215 |
| 2006/0125658 A1* | 6/2006 | Dohler | B64F 1/20 244/186 |
| 2010/0020178 A1* | 1/2010 | Kleihorst | G06T 7/85 348/175 |
| 2015/0199814 A1 | 7/2015 | Liu et al. | |
| 2015/0294158 A1* | 10/2015 | Collins | G06V 10/40 382/103 |
| 2016/0086342 A1* | 3/2016 | Yamaji | G06T 7/246 382/103 |
| 2016/0225121 A1* | 8/2016 | Gupta | G06T 3/00 |
| 2018/0308254 A1* | 10/2018 | Fu | G06T 3/0062 |
| 2019/0228232 A1* | 7/2019 | Lécart | G08G 1/0175 |
| 2020/0167938 A1* | 5/2020 | Matzner | G06V 10/143 |
| 2020/0242805 A1* | 7/2020 | Deng | G06T 7/73 |
| 2021/0033722 A1* | 2/2021 | Søndergaard | G01S 13/66 |
| 2021/0321063 A1* | 10/2021 | Abramov | G06T 7/20 |
| 2021/0385426 A1* | 12/2021 | Ebner | G06Q 30/02 |

FOREIGN PATENT DOCUMENTS

| | | |
|---|---|---|
| CN | 106485735 A | 3/2017 |
| CN | 106981077 A | 7/2017 |
| CN | 110472658 A | 11/2019 |

OTHER PUBLICATIONS

Kale, Kiran, Sushant Pawar, and Pravin Dhulekar. "Moving object tracking using optical flow and motion vector estimation." 2015 4th international conference on reliability, infocom technologies and optimization (ICRITO)(trends and future directions). IEEE, 2015. (Year: 2015).*
Jing, Yao, et al. "CrowdTracker: Optimized urban moving object tracking using mobile crowd sensing." IEEE Internet of Things Journal 5.5 (2017): 3452-3463. (Year: 2017).*
Mane, Shraddha, and Supriya Mangale. "Moving object detection and tracking using convolutional neural networks." 2018 Second International Conference on Intelligent Computing and Control Systems (ICICCS). IEEE, 2018. (Year: 2018).*
Islam, Md Zahidul, Chi-Min Oh, and Chil-Woo Lee. "Video based moving object tracking by particle filter." International Journal of Signal Processing, Image Processing and Pattern 2.1 (2009). (Year: 2009).*
Patel, Hitesh A., and Darshak G. Thakore. "Moving object tracking using kalman filter." International Journal of Computer Science and Mobile Computing 2.4 (2013): 326-332. (Year: 2013).*
Huang, Shengluan, and Jingxin Hong. "Moving object tracking system based on camshift and Kalman filter." 2011 International Conference on Consumer Electronics, Communications and Networks (CECNet). IEEE, 2011. (Year: 2011).*
Li, Xin, et al. "A multiple object tracking method using Kalman filter." The 2010 IEEE international conference on information and automation. IEEE, 2010. (Year: 2010).*
Weng, Shiuh-Ku, Chung-Ming Kuo, and Shu-Kang Tu. "Video object tracking using adaptive Kalman filter." Journal of Visual Communication and Image Representation 17.6 (2006): 1190-1208. (Year: 2006).*
Gunjal, Pramod R., et al. "Moving object tracking using kalman filter." 2018 International Conference on Advances in Communication and Computing Technology (ICACCT). IEEE, 2018. (Year: 2018).*

* cited by examiner

MULTISPECTRAL STEREO CAMERA SELF-CALIBRATION ALGORITHM BASED ON TRACK FEATURE REGISTRATION

TECHNICAL FIELD

The present invention belongs to the field of image processing and computer vision, and relates to a multispectral stereo camera self-calibration algorithm based on track feature registration.

BACKGROUND

Infrared is an electromagnetic wave with a wavelength between microwave and visible light, and its wavelength is longer than that of red light. Substances higher than absolute zero (−273.15° C.) can generate infrared rays. Infrared images are widely used in different fields such as military and national defense, resource exploration, weather forecasting, environmental monitoring, medical diagnosis and treatment and marine research due to the capability of observation through fog and rain. The infrared can be used to shoot scenes through mist and smoke, and can also be used for infrared photography at night. An infrared camera has the advantage of imaging in extreme scenes (low light, rain, snow and dense fog), and has the disadvantages of low resolution and blurred image details. In contrast, a visible light camera has the advantages of high resolution and clear image details, but cannot be used for imaging in the extreme scenes. Therefore, the combination of the infrared camera and the visible light camera has great practical significance.

Stereo vision is an important topic in the field of computer vision. The purpose is to reconstruct the 3D geometric information of the scenes. Binocular stereo vision is an important field of stereo vision. In the binocular stereo vision, left and right camera lenses are used to simulate two eyes. Depth images are calculated by calculating the difference between binocular images. The binocular stereo vision has the advantages of high efficiency, high accuracy, simple system structure and low cost. Because the binocular stereo vision needs to match the same point on the left and right image capture points, the focal length and image capture center of the two camera lenses of the camera, as well as a positional relationship between the left and right camera lenses shall be obtained. To obtain the above data, the camera is calibrated. The acquisition of the positional relationship between the visible light camera and the infrared camera is called joint calibration.

In the calibration process, two camera lens parameters and relative position parameters of the camera are obtained, but these parameters are not stable. When temperature and humidity are changed, the internal parameters of the camera lenses are also changed. In addition, due to accidental camera collision, the positional relationship between the two camera lenses may be changed. Therefore, when the camera is used, internal and external parameters must be modified, which is self-calibration. When the internal parameters of the camera are known, the positional relationship between the infrared lens and the visible light lens is corrected by extracting the features of an infrared image and the features of a visible light image respectively, that is, the joint self-calibration of the infrared camera and the visible light camera.

Because the imaging of the infrared camera is different from that of the visible light camera, fewer effective point pairs are obtained by directly extracting and matching feature points from the two cameras. In order to solve the problem, the tracks of moving objects can be used because the tracks of the moving objects may not be different due to different camera modes.

SUMMARY

The present invention aims to solve the change of a positional relationship between an infrared camera and a visible light camera due to factors such as temperature, humidity and vibration. The infrared camera and the visible light camera are used to shoot a group of moving objects at the same time. Motion tracks are extracted and matched from the moving objects, thereby obtaining an imaging relationship between the infrared camera and the visible light camera, and obtaining several corresponding feature points. The feature points are used to correct an original calibration result.

A specific technical solution is: a multispectral stereo camera self-calibration algorithm based on track feature registration comprises the following steps:

1) Using the infrared camera and the visible light camera to shoot a group of continuous frames with moving objects at the same time.

2) Original image correction: conducting de-distortion and binocular correction on an original image according to internal parameters and original external parameters of the infrared camera and the visible light camera. The flow is shown in FIG. 2.

3) Calculating tracks of the moving objects.

4) Obtaining an optimal track corresponding point and obtaining a transformation matrix from an infrared image to a visible light image accordingly.

5) Further optimizing the matching results of the track corresponding points: selecting the number of registration point pairs with lower error as candidate feature point pairs.

6) Judging a feature point coverage area: dividing the image into m*n grids; if the feature points cover all the grids, executing a next step; otherwise continuing to shoot the image and repeating step 1) to step 5).

7) Correcting the calibration result: using image coordinates of all the feature points to calculate the positional relationship between the two cameras after correction; and then superimposing with the original external parameters.

The original image correction in the step 2) specifically comprises the following steps:

2-1) Calculating the coordinates in a normal coordinate system corresponding to the pixel points of the image, wherein a pixel coordinate system takes the upper left corner of the image as an origin, and x-axis and y-axis of the pixel coordinate system are parallel to x-axis and y-axis of an image coordinate system, respectively; the unit of the pixel coordinate system is the pixel; the pixel is a basic and indivisible unit of image display; taking the optical center of the camera as the origin of the image coordinate system and scaling the distance from the optical center to an image plane to 1; the relationship between pixel coordinates and normal coordinates is as follows:

$$u = KX$$

$$\begin{bmatrix} u \\ v \\ 1 \end{bmatrix} = \begin{bmatrix} f_x & 0 & c_x \\ 0 & f_y & c_y \\ 0 & 0 & 1 \end{bmatrix} \begin{bmatrix} X \\ Y \\ 1 \end{bmatrix}$$

wherein $$u = \begin{bmatrix} u \\ v \\ 1 \end{bmatrix}$$

indicates the pixel coordinate of the image;

$$K = \begin{bmatrix} f_x & 0 & c_x \\ 0 & f_y & c_y \\ 0 & 0 & 1 \end{bmatrix}$$

indicates an internal parameter matrix of the camera; $f_x$ and $f_y$ respectively indicate the focal distances of the image in x direction and y direction; the unit is the pixel; $(c_x, c_y)$ indicates the principal point position of the camera, i.e., the corresponding position of the camera center on the image; and $$X = \begin{bmatrix} X \\ Y \\ 1 \end{bmatrix}$$

is a coordinate in the normal coordinate system. the normal coordinate system corresponding to the pixel points is calculated, i.e., $X = K^{-1}u$, through the known pixel coordinate system of the image and the internal parameters of the camera;

2-2) Removing image distortion: due to the limitation of a lens production process, a lens under actual conditions has some distortion phenomena, causing nonlinear distortion. Therefore, a pure linear model cannot accurately describe an imaging geometric relationship. The nonlinear distortion can be roughly classified into radial distortion and tangential distortion.

The radial distortion of the image is a position deviation of the image pixel points with the distortion center as the center point along the radial direction, thereby causing the distortion of the picture formed in the image. The radial distortion is roughly described as follows:

$x_d = x(1 + k_1 r^2 + k_2 r^4 + k_3 r^6)$ $y_d = y(1 + k_1 r^2 + k_2 r^4 + k_3 r^6)$ wherein $r^2 = x^2 + y^2$; $k_1$, $k_2$ and $k_3$ are radial distortion parameters.

The tangential distortion of the image is generated by the defect in the camera manufacturing that makes the lens not parallel to the image plane, and can be quantitatively described as:

$x_d = x + (2p_1 xy + p_2(r^2 + 2x^2))$ $y_d = y + (p_1(r^2 + 2y^2) + 2p_2 xy)$ wherein $p_1$ and $p_2$ are tangential distortion coefficients.

In conclusion, the coordinate relationship before and after distortion is as follows:

$x_d = x(1 + k_1 r^2 + k_2 r^4 + k_3 r^6) + (2p_1 xy + p_2(r^2 + 2x^2))$ $y_d = y(1 + k_1 r^2 + k_2 r^4 + k_3 r^6) + (p_1(r^2 + 2y^2) + 2p_2 xy)$ wherein (x,y) is a normal coordinate in an ideal state, and $(x_d, y_d)$ is an actual normal coordinate with distortion.

2-3) Reversing the two images according to the original rotation relationship between the two cameras: an original rotation matrix R and a translation vector t between the two cameras are known:

$X_r = RX_l + t$ wherein $X_l$ indicates the normal coordinate of the infrared camera, and $X_r$ indicates the normal coordinate of the visible light camera. The infrared image is rotated to positive direction of R by half an angle, and the visible light image is rotated to opposite direction of R by half an angle.

2-4) Restoring the de-distorted and rotated image to the pixel coordinate system according to the formula u=KX.

The step 4) of obtaining the optimal track corresponding point specifically comprises the following steps:

4-1) Randomly selecting a pair of tracks, and repeating the following steps until the error is small enough:
  a. Randomly selecting 4 pairs of points from the selected track pair;
  b. Calculating a transformation matrix H from infrared image points to visible light image points;
  c. Adding point pairs with small enough error obtained by using the transformation matrix H;
  d. Recalculating H;
  e. Calculating and assessing the error;

4-2) Adding a track pair with a small enough error obtained by using the transformation matrix H.

4-3) Recalculating H.

4-4) Calculating and assessing the error, and if the error is not small enough, repeating step 4-1).

The step 7) of correcting the calibration result specifically comprises the following steps:

7-1) Further screening the point pairs by using random sample consensus (RANSAC).

7-2) Solving a basic matrix F and an essential matrix E: a relationship between the pixel points $u_l$ and $u_r$ corresponding to infrared light and visible light and the basic matrix F is:

$u_r^T F u_l = 0$

The coordinates of the corresponding points are substituted into the above formula to construct a homogeneous linear equation system to solve F.

A relationship between the basic matrix and the essential matrix is:

$E = K_r^T F K_l$ wherein $K_l$ and $K_r$ are respectively the internal parameter matrices of the infrared camera and the visible light camera.

7-3) Decomposing a relationship between rotation and translation from the essential matrix: the relationship between the essential matrix E and rotation R and translation t is as follows:

$E = [t]_\times R$ wherein $[t]_\times$ indicates a cross product matrix of t.

Conducting singular value decomposition on E to obtain:

$$E = U \sum V^T = U \begin{bmatrix} 1 & 0 & 0 \\ 0 & 1 & 0 \\ 0 & 0 & 0 \end{bmatrix} V^T$$

Defining two matrices $$Z = \begin{bmatrix} 0 & 1 & 0 \\ -1 & 0 & 0 \\ 0 & 0 & 0 \end{bmatrix} \text{ and } W = \begin{bmatrix} 0 & -1 & 0 \\ 1 & 0 & 0 \\ 0 & 0 & 1 \end{bmatrix}, ZW = \Sigma$$

Thus, writing E in the following two forms
(1) $E = UZU^T UWV^T$
setting $[t]_\times = UZU^T$, $R = UWV^T$
(2) $E = -UZU^T UW^T V^T$
setting $[t]_\times = -UZU^T$, $R = UW^T V^T$ 7-4) Superimposing the decomposed relationship between rotation and translation into the original positional relationship between the infrared camera and the visible light camera;

Recording the rotation matrix before de-distortion as $R_0$ and the translation vector as $t_0 = (t_x, t_y, t_z)^T$; recording the rotation matrix calculated in the previous step as R and the translation vector as $t = (t_x', t_y', t_z')^T$ and new $R_{new}$ and $t_{new}$ are as follows:

$$R_{new} = R_0^{1/2} R R_0^{1/2}$$

$$t_{new} = R_0^{1/2} t_x \begin{bmatrix} 1 & \dfrac{t_y'}{t_x'} & \dfrac{t_z'}{t_x'} \end{bmatrix};$$

In addition, multiplying $t_{new}$ by a coefficient so that the component of $t_{new}$ in x direction is $t_x^{new} = t_x$.

The present invention has the following beneficial effects:

The present invention solves the change of the positional relationship between the infrared camera and the visible light camera due to factors such as temperature, humidity and vibration, and has the advantages of high speed, accurate results and simple operation. Compared with an ordinary method, the present invention uses the tracks of the moving objects as the features required for self-calibration. The advantage of using the tracks is good cross-modal robustness. In addition, direct matching of the tracks also saves the steps of extraction and matching the feature points.

DETAILED DESCRIPTION

The present invention solves the change of a positional relationship between an infrared camera and a visible light camera due to factors such as temperature, humidity and vibration. The present invention will be described in detail below in combination with drawings and embodiments.

1) Using the infrared camera and the visible light camera to shoot a group of continuous frames with moving objects at the same time.

Figure 1:
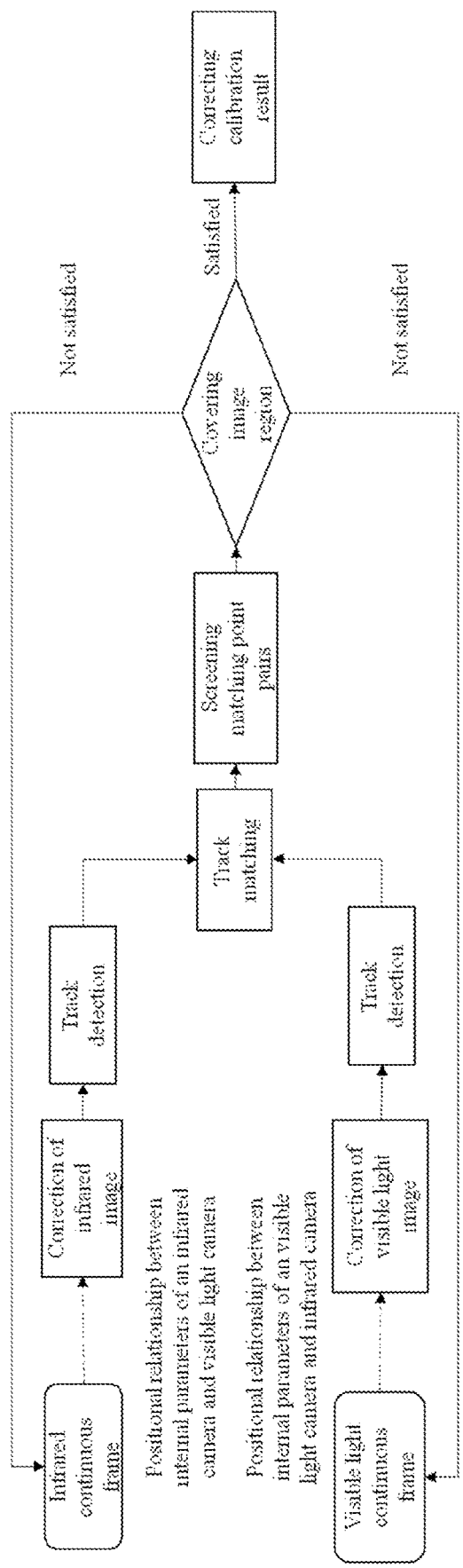
FIG. 1 is an overall flow chart.
Figure 2:
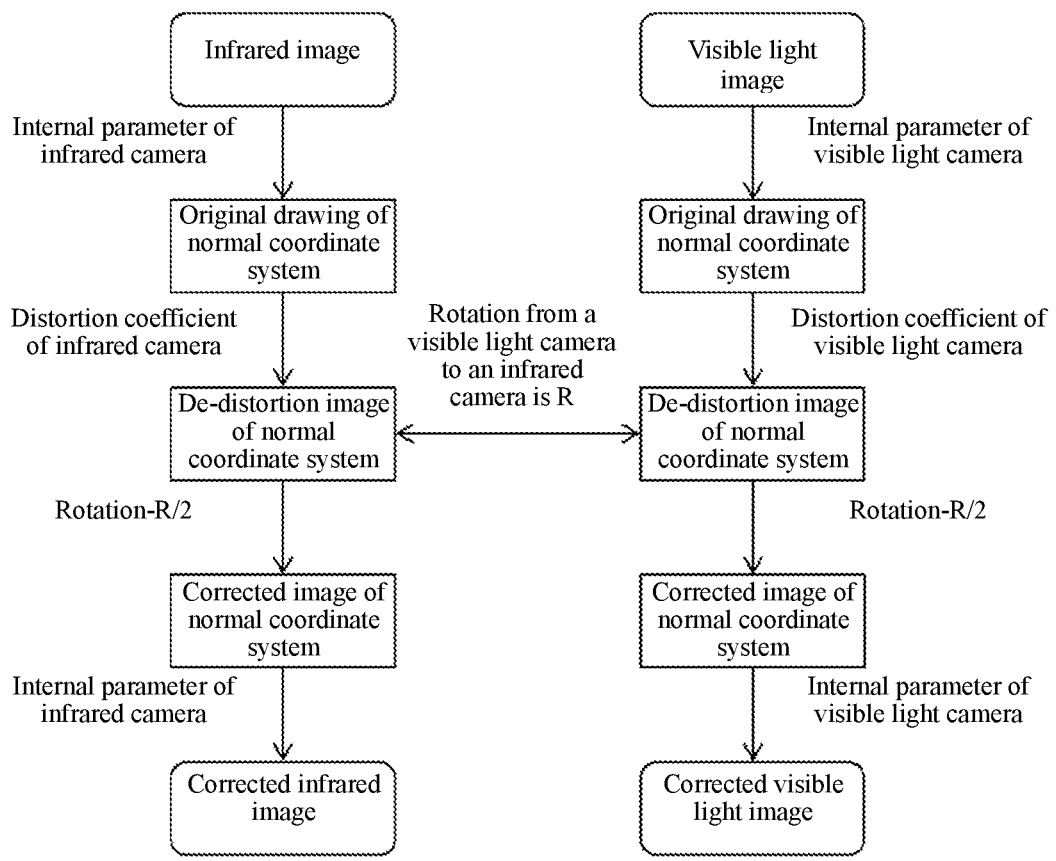
FIG. 2 is a correction flow chart.

2) Original image correction: conducting de-distortion and binocular correction on an original image according to internal parameters and original external parameters of the infrared camera and the visible light camera. The flow is shown in FIG. 2.

2-1) Calculating the coordinates in a normal coordinate system corresponding to the pixel points of the image, wherein the normal coordinate system is the projection of a camera coordinate system on the plane Z=1; the camera coordinate system is a coordinate system which takes the center of the camera as an origin of the image coordinate system, takes image directions as XY axis directions and takes a direction perpendicular to the image as Z axis direction; a pixel coordinate system takes the upper left corner of the image as an origin, and x-axis and y-axis of the pixel coordinate system are parallel to x-axis and y-axis of the image coordinate system, respectively; the unit of the pixel coordinate system is the pixel; the relationship between pixel coordinates and normal coordinates is as follows:

$$u = KX$$

$$\begin{bmatrix} u \\ v \\ 1 \end{bmatrix} = \begin{bmatrix} f_x & 0 & c_x \\ 0 & f_y & c_y \\ 0 & 0 & 1 \end{bmatrix} \begin{bmatrix} X \\ Y \\ 1 \end{bmatrix}$$

wherein $$u = \begin{bmatrix} u \\ v \\ 1 \end{bmatrix}$$

indicates the pixel coordinate of the image;

$$K = \begin{bmatrix} f_x & 0 & c_x \\ 0 & f_y & c_y \\ 0 & 0 & 1 \end{bmatrix}$$

indicates an internal parameter matrix of the camera; $f_x$ and $f_y$ respectively indicate the focal distances of the image in x direction and y direction; the unit is the pixel; $(c_x, c_y)$ indicates the principal point position of the camera, i.e., the corresponding position of the camera center on the image; and $$X = \begin{bmatrix} X \\ Y \\ 1 \end{bmatrix}$$

is a coordinate in the normal coordinate system. the normal coordinate system corresponding to the pixel points is calculated, i.e., $X = K^{-1} u$, through the known pixel coordinate system of the image and the internal parameters of the camera;

2-2) Removing image distortion: due to the limitation of a lens production process, a lens under actual conditions has some distortion phenomena, causing nonlinear distortion. Therefore, a pure linear model cannot accurately describe an imaging geometric relationship. The nonlinear distortion can be roughly classified into radial distortion and tangential distortion.

The radial distortion of the image is a position deviation of the image pixel points with the distortion center as the center point along the radial direction, thereby causing the distortion of the picture formed in the image. The radial distortion is roughly described as follows:

$$x_d = x(1 + k_1 r^2 + k_2 r^4 + k_3 r^6)$$

$$y_d = y(1 + k_1 r^2 + k_2 r^4 + k_3 r^6)$$

wherein $r^2=x^2+y^2$; $k_1$, $k_2$ and $k_3$ are radial distortion parameters.

The tangential distortion of the image is generated by the defect in the camera manufacturing that makes the lens not parallel to the image plane, and can be quantitatively described as:

$$x_d=x+(2p_1xy+p_2(r^2+2x^2))$$

$$y_d=y+(p_1(r^2+2y^2)+2p_2xy)$$

wherein $p_1$ and $p_2$ are tangential distortion coefficients.

In conclusion, the coordinate relationship before and after distortion is as follows:

$$x_d=x(1+k_1r^2+k_2r^4+k_3r^6)+(2p_1xy+p_2(r^2+2x^2))$$

$$y_d=y(1+k_1r^2+k_2r^4+k_3r^6)+(p_1(r^2+2y^2)+2p_2xy)$$

wherein (x,y) is a normal coordinate in an ideal state, and $(x_d,y_d)$ is an actual normal coordinate with distortion.

2-3) Reversing the two images according to the original rotation relationship between the two cameras: an original rotation matrix R and a translation vector t between the two cameras are known:

$$X_r=RX_l+t$$

wherein $X_l$ indicates the normal coordinate of the infrared camera, and $X_r$ indicates the normal coordinate of the visible light camera. The infrared image is rotated to positive direction of R by half an angle, and the visible light image is rotated to opposite direction of R by half an angle.

2-4) Restoring the de-distorted and rotated image to the pixel coordinate system according to the formula u=KX.

3) Calculating tracks of the moving objects.

4) Obtaining an optimal track corresponding point and obtaining a transformation matrix from an infrared image to a visible light image accordingly.

4-1) Randomly selecting a pair of tracks, and repeating the following steps until the error is small enough:

Randomly selecting 4 pairs of points from the selected track pair.
Calculating a transformation matrix H from infrared image points to visible light image points.
Adding point pairs with small enough error obtained by using the transformation matrix H.
Recalculating H.
Calculating and assessing the error.

4-2) Adding a track pair with a small enough error obtained by using the transformation matrix H.

4-3) Recalculating H.

4-4) Calculating and assessing the error, and if the error is not small enough, repeating step 4-1).

5) Further optimizing the matching results of the track corresponding points: selecting the number of registration point pairs with lower error as candidate feature point pairs.

6) Judging a feature point coverage area: dividing the image into m*n grids; if the feature points cover all the grids, executing a next step; otherwise continuing to shoot the image and repeating step 1) to step 5).

7) Correcting the calibration result: using image coordinates of all the feature points to calculate the positional relationship between the two cameras after correction; and then superimposing with the original external parameters.

7-1) Further screening the point pairs by using random sample consensus (RANSAC).

7-2) Solving a basic matrix F and an essential matrix E: a relationship between the pixel points $u_l$ and $u_r$ correspond ing to infrared light and visible light and the basic matrix F is:

$$u_r^T F u_l = 0$$

The coordinates of the corresponding points are substituted into the above formula to construct a homogeneous linear equation system to solve F.

A relationship between the basic matrix and the essential matrix is:

$$E=K_r^T F K_l$$

wherein $K_l$ and $K_r$ are respectively the internal parameter matrices of the infrared camera and the visible light camera.

7-3) Decomposing a relationship between rotation and translation from the essential matrix: the relationship between the essential matrix E and rotation R and translation t is as follows:

$$E=[t]_\times R$$

wherein $[t]_\times$ indicates a cross product matrix of t.

Conducting singular value decomposition on E to obtain:

$$E = U\sum V^T = U\begin{bmatrix} 1 & 0 & 0 \\ 0 & 1 & 0 \\ 0 & 0 & 0 \end{bmatrix}V^T$$

Defining two matrices $$Z = \begin{bmatrix} 0 & 1 & 0 \\ -1 & 0 & 0 \\ 0 & 0 & 0 \end{bmatrix} \text{ and } W = \begin{bmatrix} 0 & -1 & 0 \\ 1 & 0 & 0 \\ 0 & 0 & 1 \end{bmatrix}, ZW = \sum$$

Thus, writing E in the following two forms
(1) $E=UZU^TUWV^T$
setting $[t]_\times=UZU^T$, $R=UWV^T$
(2) $E=-UZU^TUW^TV^T$
setting $[t]_\times=-UZU^T$, $R=UW^TV^T$ 7-4) Superimposing the decomposed relationship between rotation and translation into the original positional relationship between the infrared camera and the visible light camera;

Recording the rotation matrix before de-distortion as $R_0$ and the translation vector as $t_0=(t_x, t_y, t_z)^T$; recording the rotation matrix calculated in the previous step as R and the translation vector as $t=(t_x', t_y', t_z')^T$; and new $R_{new}$ and $t_{new}$ are as follows:

$$R_{new} = R_0^{1/2} R R_0^{1/2}$$

$$t_{new} = R_0^{1/2} t_x \begin{bmatrix} 1 & \dfrac{t_y'}{t_x'} & \dfrac{t_z'}{t_x'} \end{bmatrix};$$

In addition, multiplying $t_{new}$ by a coefficient so that the component of $t_{new}$ in x direction is $t_x^{new}=t_x$.

The invention claimed is:

1. A multispectral stereo camera self-calibration algorithm based on track feature registration, stored on a non-transitory computer-readable medium, comprising the following steps:

1) using an infrared camera and a visible light camera to shoot a group of continuous frames with moving objects at the same time;

2) original image correction: conducting de-distortion and binocular correction on an original image according to internal parameters and original external parameters of the infrared camera and the visible light camera;
3) calculating tracks of the moving objects;
4) obtaining an optimal track corresponding point and obtaining a transformation matrix from an infrared image to a visible light image accordingly;
5) further optimizing matching results of the track corresponding points: selecting the number of registration point pairs with lower error as candidate feature point pairs;
6) judging a feature point coverage area: dividing the image into m*n grids; if the feature points cover all the grids, executing a next step; otherwise continuing to shoot the image and repeating step 1) to step 5);
7) correcting the calibration result: using image coordinates of all the feature points to calculate the positional relationship between the two cameras after correction; and then superimposing with the original external parameters.

2. The multispectral stereo camera self-calibration algorithm based on track feature registration according to claim 1, wherein the original image correction in the step 2) specifically comprises the following steps:

2-1) calculating the coordinates in a normal coordinate system corresponding to the pixel points of the image, wherein a pixel coordinate system takes the upper left corner of the image as an origin, and x-axis and y-axis of the pixel coordinate system are parallel to x-axis and y-axis of an image coordinate system, respectively; the unit of the pixel coordinate system is the pixel; taking the optical center of the camera as the origin of the image coordinate system and scaling the distance from the optical center to an image plane to 1; the relationship between pixel coordinates and normal coordinates is as follows:

$$u = KX$$

$$\begin{bmatrix} u \\ v \\ 1 \end{bmatrix} = \begin{bmatrix} f_x & 0 & c_x \\ 0 & f_y & c_y \\ 0 & 0 & 1 \end{bmatrix} \begin{bmatrix} X \\ Y \\ 1 \end{bmatrix}$$

wherein $$u = \begin{bmatrix} u \\ v \\ 1 \end{bmatrix}$$

indicates the pixel coordinate of the image;

$$K = \begin{bmatrix} f_x & 0 & c_x \\ 0 & f_y & c_y \\ 0 & 0 & 1 \end{bmatrix}$$

indicates an internal parameter matrix of the camera; $f_x$ and $f_y$ respectively indicate the focal distances of the image in x direction and y direction; the unit is the pixel; $(c_x, c_y)$ indicates the principal point position of the camera;

$$X = \begin{bmatrix} X \\ Y \\ 1 \end{bmatrix}$$

is a coordinate in the normal coordinate system; the normal coordinate system corresponding to the pixel points is calculated through the known pixel coordinate system of the image and the internal parameters of the camera, i.e., $$X = K^{-1}u$$

2-2) removing image distortion: the radial distortion of the image is a position deviation of the image pixel points with the distortion center as the center point along the radial direction, thereby causing the distortion of the picture formed in the image; the radial distortion is described as follows:

$$x_d = x(1 + k_1 r^2 + k_2 r^4 + k_3 r^6)$$

$$y_d = y(1 + k_1 r^2 + k_2 r^4 + k_3 r^6)$$

wherein $r^2 = x^2 + y^2$; $k_1$, $k_2$ and $k_3$ are radial distortion parameters;

the tangential distortion of the image is generated by the defect in the camera manufacturing that makes the lens not parallel to the image plane, and is quantitatively described as:

$$x_d = x + (2p_1 xy + p_2(r^2 + 2x^2))$$

$$y_d = y + (p_1(r^2 + 2y^2) + 2p_2 xy)$$

wherein $p_1$ and $p_2$ are tangential distortion coefficients;

the coordinate relationship before and after distortion is as follows:

$$x_d = x(1 + k_1 r^2 + k_2 r^4 + k_3 r^6) + (2p_1 xy + p_2(r^2 + 2x^2))$$

$$y_d = y(1 + k_1 r^2 + k_2 r^4 + k_3 r^6) + (p_1(r^2 + 2y^2) + 2p_2 xy)$$

wherein (x,y) is a normal coordinate in an ideal state, and $(x_d, y_d)$ is an actual normal coordinate with distortion;

2-3) reversing the two images according to the original rotation relationship between the two cameras: an original rotation matrix R and a translation vector t between the two cameras are known:

$$X_r = RX_l + t$$

wherein $X_l$ indicates the normal coordinate of the infrared camera, and $X_r$ indicates the normal coordinate of the visible light camera; the infrared image is rotated to positive direction of R by half an angle, and the visible light image is rotated to opposite direction of R by half an angle;

2-4) restoring the de-distorted and rotated image to the pixel coordinate system according to the formula $u = KX$.

3. The multispectral stereo camera self-calibration algorithm based on track feature registration according to claim 1, wherein the step 4) of obtaining the optimal track corresponding point comprises the following steps:

4-1) randomly selecting a pair of tracks, and repeating the following steps until the error is small enough:
   a. randomly selecting 4 pairs of points from the selected track pair;
   b. calculating a transformation matrix H from infrared image points to visible light image points;
   c. adding point pairs with small enough error obtained by using the transformation matrix H;
   d. recalculating H;
   e. calculating and assessing the error;
4-2) adding a track pair with a small enough error obtained by using the transformation matrix H;
4-3) recalculating H;
4-4) calculating and assessing the error, and if the error is not small enough, repeating step 4-1).

4. The multispectral stereo camera self-calibration algorithm based on track feature registration according to claim 1, wherein the step 7) of correcting the calibration result comprises the following steps:
   7-1) further screening the point pairs by using random sample consensus;
   7-2) solving a basic matrix F and an essential matrix E: a relationship between the pixel points $u_l$ and $u_r$ corresponding to infrared light and visible light and the basic matrix F is:

$u_r^T F u_l = 0$ substituting the coordinates of the corresponding points into the above formula to construct a homogeneous linear equation system to solve F;
   a relationship between the basic matrix and the essential matrix is:

$E = K_r^T F K_l$ wherein $K_l$ and $K_r$ are respectively the internal parameter matrices of the infrared camera and the visible light camera;
   7-3) decomposing a relationship between rotation and translation from the essential matrix: the relationship between the essential matrix E and rotation R and translation t is as follows:

$E = [t]_\times R$ wherein $[t]_\times$ indicates a cross product matrix of t;

conducting singular value decomposition on E to obtain:

$$E = U \sum V^T = U \begin{bmatrix} 1 & 0 & 0 \\ 0 & 1 & 0 \\ 0 & 0 & 0 \end{bmatrix} V^T$$

defining two matrices $$Z = \begin{bmatrix} 0 & 1 & 0 \\ -1 & 0 & 0 \\ 0 & 0 & 0 \end{bmatrix} \text{ and } W = \begin{bmatrix} 0 & -1 & 0 \\ 1 & 0 & 0 \\ 0 & 0 & 1 \end{bmatrix}, ZW = \sum$$

thus, writing E in the following two forms
   (1) $E = UZU^T UWV^T$
   setting $[t]_\times = UZU^T$, $R = UWV^T$
   (2) $E = -UZU^T UW^T V^T$
   setting $[t]_\times = -UZU^T$, $R = UW^T V^T$
   7-4) superimposing the decomposed relationship between rotation and translation into the original positional relationship between the infrared camera and the visible light camera;
   recording the rotation matrix before de-distortion as $R_0$ and the translation vector as $t_0 = (t_x, t_y, t_z)^T$ recording the rotation matrix calculated in the previous step as R and the translation vector as $t = (t'_x, t'_y, t'_z)^T$ and new $R_{new}$ and $t_{new}$ are as follows:

$R_{new} = R_0^{1/2} R R_0^{1/2}$ $t_{new} = R_0^{1/2} t_x \begin{bmatrix} 1 & \dfrac{t'_y}{t'_x} & \dfrac{t'_z}{t'_x} \end{bmatrix}$;

in addition, multiplying $t_{new}$ by a coefficient so that the component of $t_{new}$ in x direction is $t_x^{new} = t_x$.

* * * * *